(12) United States Patent  
Abecassis et al.

(10) Patent No.: US 8,567,810 B2  
(45) Date of Patent: Oct. 29, 2013

(54) FOLDABLE SHOPPING CART

(75) Inventors: Yehuda Abecassis, Ashdod (IL); Ronen Berman, Matan (IL)

(73) Assignee: Yehuda Abecassis, Ashdod (IL)

( * ) Notice: Subject to any disclaimer, the term of this patent is extended or adjusted under 35 U.S.C. 154(b) by 0 days.

(21) Appl. No.: 13/634,664

(22) PCT Filed: Mar. 13, 2011

(86) PCT No.: PCT/IL2011/000243  
§ 371 (c)(1),  
(2), (4) Date: Sep. 13, 2012

(87) PCT Pub. No.: WO2011/114326  
PCT Pub. Date: Sep. 22, 2011

(65) Prior Publication Data  
US 2013/0001926 A1 Jan. 3, 2013

Related U.S. Application Data

(60) Provisional application No. 61/313,809, filed on Mar. 15, 2010.

(51) Int. Cl.  
*B62B 1/00* (2006.01)

(52) U.S. Cl.  
USPC ......... 280/651; 280/654; 280/638; 280/47.18

(58) Field of Classification Search  
USPC ............ 280/47.17–47.18, 47.19, 47.2, 47.24, 280/47.26, 47.28, 63, 79.2, DIG. 6  
See application file for complete search history.

(56) References Cited

U.S. PATENT DOCUMENTS

| | | | | |
|---|---|---|---|---|
| 5,123,665 | A | * | 6/1992 | Levy ............................... 280/35 |
| 7,264,265 | B2 | * | 9/2007 | Shapiro ........................ 280/643 |
| 2002/0149176 | A1 | | 10/2002 | Miller |
| 2007/0096437 | A1 | * | 5/2007 | Watson ......................... 280/651 |
| 2009/0283989 | A1 | * | 11/2009 | Abecassis ..................... 280/651 |

FOREIGN PATENT DOCUMENTS

DE 10159706 A1 6/2003

OTHER PUBLICATIONS

International Search Report and Written Opinion dated Aug. 2, 2011 in corresponding International Application No. PCT/IL2011/000243.

* cited by examiner

*Primary Examiner* — John Walters  
*Assistant Examiner* — James Triggs  
(74) *Attorney, Agent, or Firm* — The Law Office of Michael E. Kondoudis

(57) ABSTRACT

A foldable cart (100) comprising a foldable framework with foldable wheel units (140) and flexible containers (130) attachable thereto. The cart may be folded to fit a vehicle's luggage room, and the containers may be used to store products when attached to the framework, and carry them on when the framework is folded. The framework and the wheels may be folded inwardly such as to minimize the volume and the dimensions of the folded cart.

6 Claims, 3 Drawing Sheets

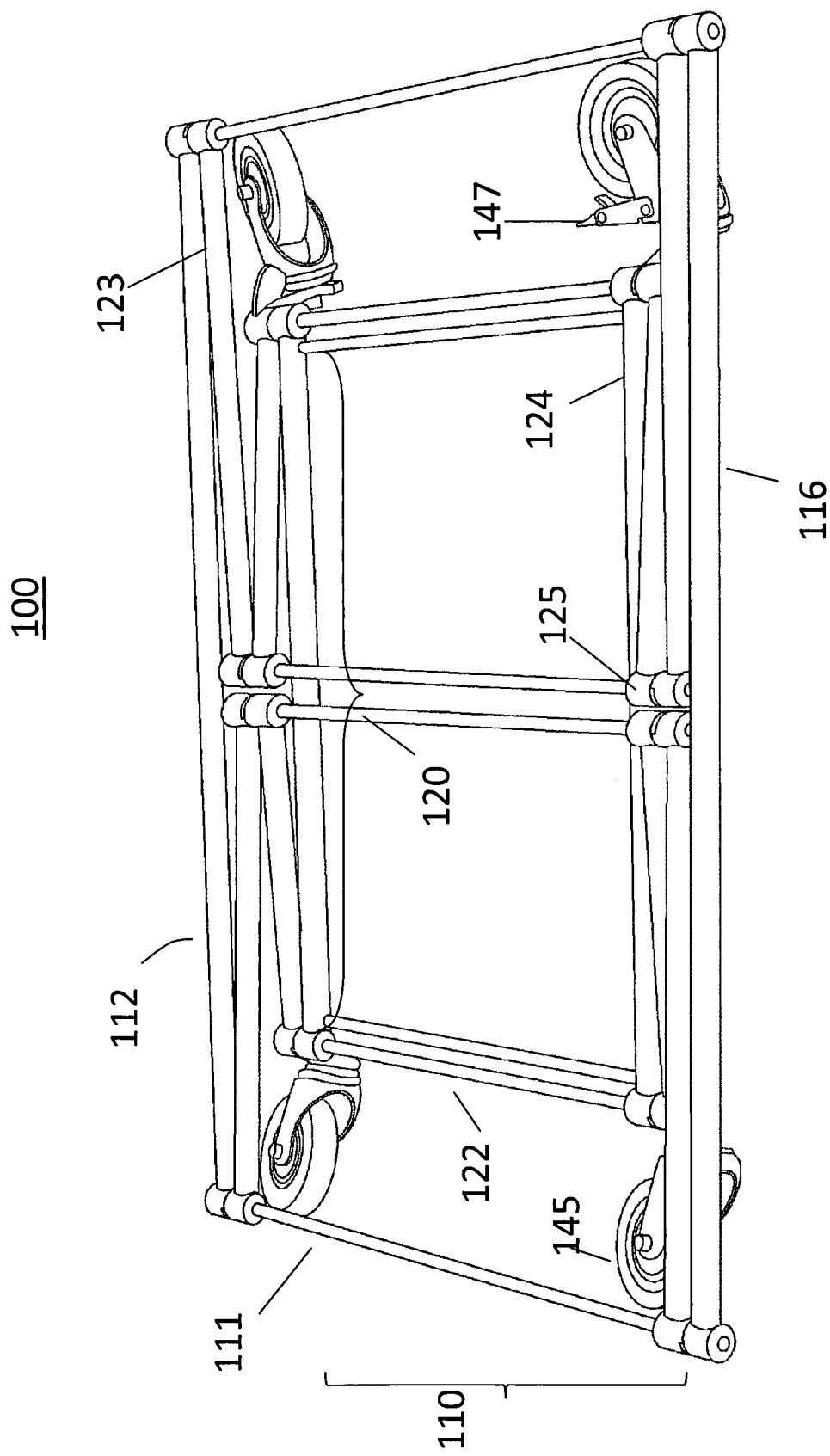

FOLDABLE SHOPPING CART

BACKGROUND

1. Technical Field

The present invention relates to the field of carts, and more particularly, to a foldable shopping cart.

2. Discussion of Related Art

Shopping cart are in common use, yet they either have a small volume (when foldable) or must be rented and used only on the shopping grounds.

BRIEF SUMMARY

Embodiments of the present invention provide a foldable cart comprising: a foldable framework comprising an upper frame connected via a plurality of jointed connectors to a lower frame, each jointed connector having a joint arranged to allow folding the jointing connector in such a way that the upper frame overlaps the lower frame in a folded state of the cart; at least one flexible container removably attached to the foldable framework in an unfolded state thereof; and a plurality of foldable wheel units comprising wheels and connected to the lower frame opposite to the connectors, the wheel units arranged to be folded in the folded state such as to minimize a volume of the cart in the folded state creating flat connections, wherein in the unfolded state the cart functions as a shopping cart and in the folded state the cart fits into small space such as a vehicle's luggage room.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which:

FIG. 3 is an illustration of the foldable cart in a folded state according to some embodiments of the invention.

DETAILED DESCRIPTION

Figure 1:
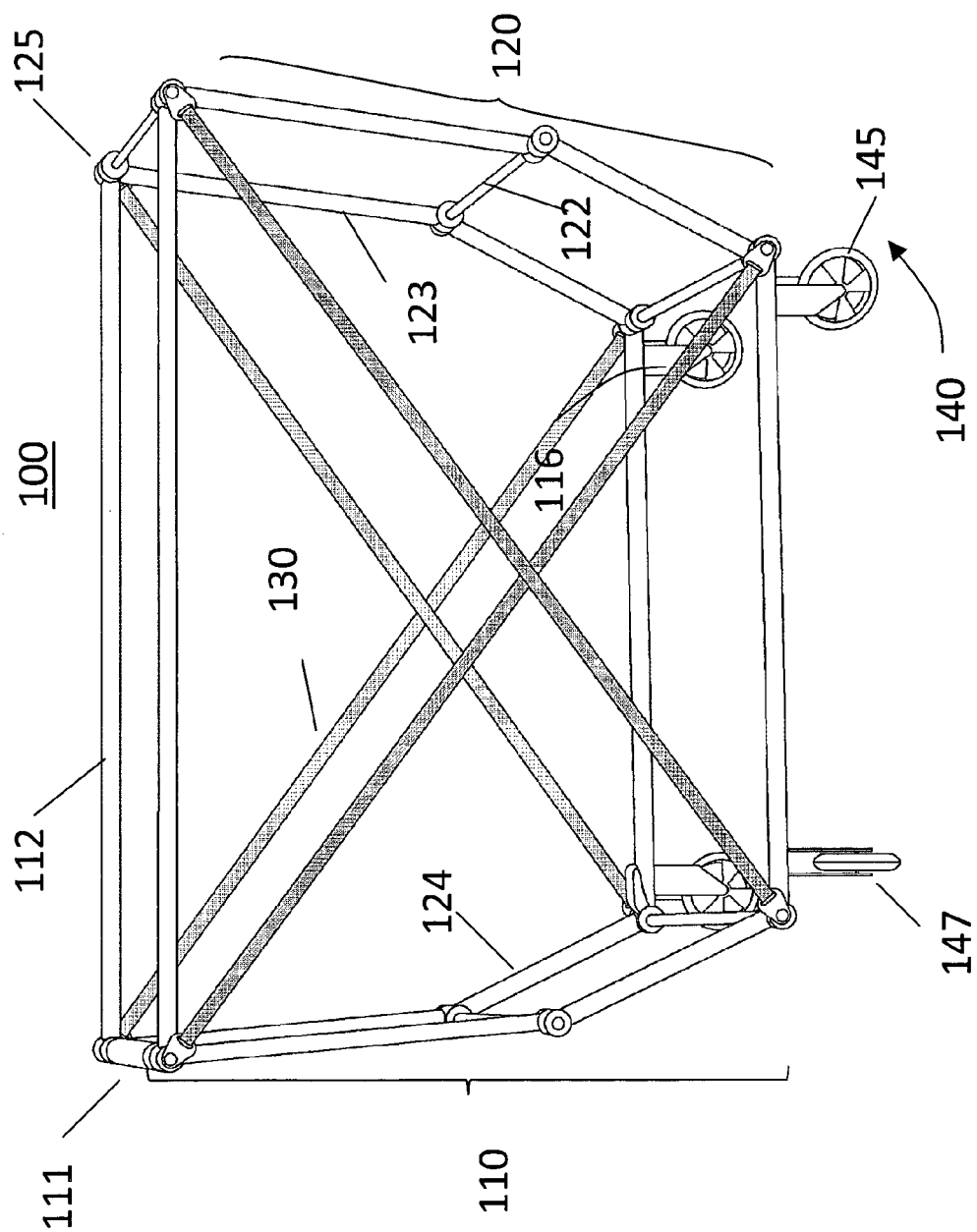
FIG. 1 is an illustration of a foldable cart in an unfolded state according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
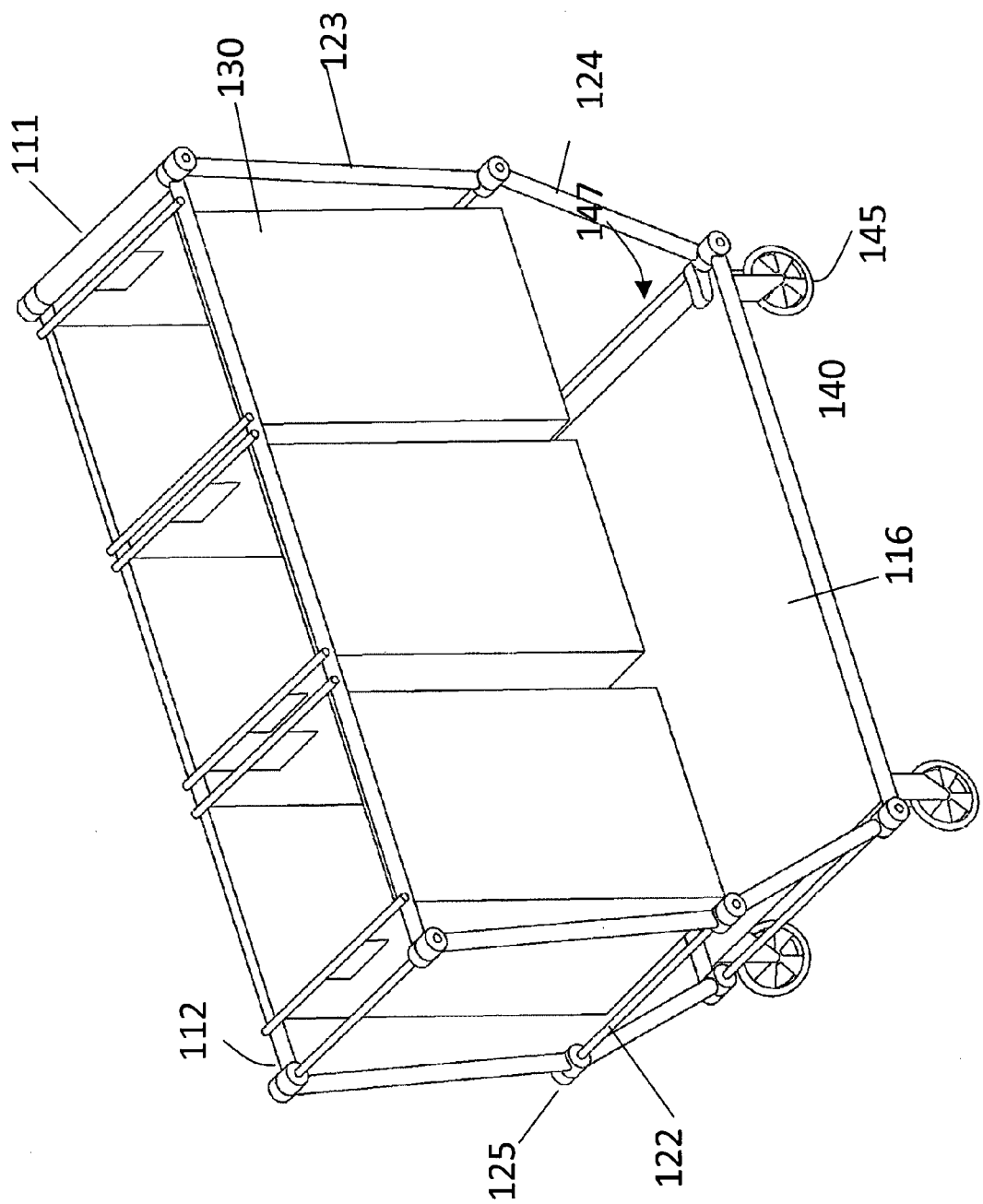
FIG. 2 is an illustration of a foldable cart in an unfolded state with flexible containers, according to some embodiments of the invention.

FIG. 1 is a schematic an illustration of a foldable cart 100 in an unfolded state according to some embodiments of the invention. FIG. 2 is an illustration of the foldable cart 100 in an unfolded state with flexible containers 130, according to some embodiments of the invention.

FIG. 3 is an illustration of foldable cart 100 in a folded state according to some embodiments of the invention. In the unfolded state cart 100 functions as a shopping cart and in the folded state cart 100 has flat structure to fits into a small storage space such as vehicle's luggage room.

Foldable cart 100 comprises a foldable framework 110 comprising an upper frame 112 connected via a plurality of jointed connectors 120 to a lower frame 116. Foldable cart 100 may further comprise a handle 111 attached to upper frame 112, handle 111 is arranged to allow pulling or pushing cart 100.

Each jointed connector 120 has a joint 125 arranged to allow folding jointing connector 120 in such a way that upper frame 112 is substantially congruent to, or at least overlaps lower frame 116 in the folded state of cart 100. In cases upper frame 112 and lower frame 116 have different forms, in the folded state they are arranged to have a maximal overlap.

Foldable framework may further comprise re-enforcing elements 122 connected horizontally between the joined connectors 120. Jointed connectors 120 may have two parts 123, 124 connected by joint 125. Connectors 120 may be arranged to fold from a convex state in the unfolded state of cart 100 inwards through a convex state to the folded state, in which two parts 123, 124 are parallel to each other.

According to some embodiment of the present invention the foldable framework may further comprise re-enforcing straps 130 connected to joint 125.

Foldable cart 100 comprises at least one flexible container 130 removably attached to foldable framework 110 in the unfolded state thereof. Flexible container 130 of various sizes may be connected to framework 110, and may be sold as a kit comprising containers 130 of different sizes, meant for use in different situations, like buying large or small products. After detaching containers 130 from framework 110, they may be used for carrying products, e.g., as a shopping bag for groceries. Flexible container 130 may be made, e.g., from plastic or cloth, may be washable, printed, etc.

Foldable cart 100 comprises a plurality of wheel units 140 comprising wheels 145 and connected to lower frame 116 on an opposite side in respect to connectors 120, and arranged to allow pushing and dragging cart 100 easily. Wheel units 140 may also be foldable in the folded state such as to minimize the volume of the folded cart 100.

At last one of wheel units 140 may comprise a direction stopper 147 arranged to fixate the orientation of the corresponding wheel 145. Direction stopper 147 may be released to allow free movement of corresponding wheel 145.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A foldable cart comprising:
a foldable framework comprising an upper frame (112) connected via a plurality of jointed connectors (110, 120) to a lower frame (116), each jointed connector having two parts (123, 124) connected by a joint (125), wherein one part is connected to the upper frame and the second part is connected to the lower frame, arranged to allow folding the jointed connector, wherein the two parts of the joint connector at folded state are parallel to each other, such that the upper frame overlaps the lower frame in a folded state of the cart,
the jointed connector parts are folded from a first convex state in the unfolded state of the cart inwards through a second convex state to the folded state, in which two parts (123, 124) are parallel to each other,
wherein at first convex state the connectors align with cart framework at the unfolded state and at the second convex state the connectors face inwards in relation to the cart framework at the unfolded state, and
wherein each pair of joints (125) are connected horizontally by re-enforcing elements (122);
at least one flexible container removably attached to the foldable framework in an unfolded state thereof;
a plurality of re-enforcing straps connecting between joints of the upper frame and joints of the lower frame; and
a plurality of foldable wheel units comprising wheels and connected to the lower frame opposite to the connectors, the wheel units arranged to be folded in the folding direction of the jointed connectors in the folded state creating flat structure, such as to minimize the volume of the cart in the folded state,
wherein in the unfolded state the cart functions as a shopping cart and in the folded state the cart has a flat structure to fits into small storage space.

2. The foldable cart of claim 1, comprises a plurality of flexible container in different sizes removable attached to the foldable framework in an unfolded state thereof.

3. The foldable cart of claim 1, wherein the at least one flexible container is arranged to be useable as a shopping bag when detached from the foldable cart.

4. The foldable cart of claim 1, wherein the at least one flexible container is made of at least one of: plastic; and cloth.

5. The foldable cart of claim 1, further comprising a handle attached to the upper frame.

6. The foldable cart of claim 1, wherein at last one of the wheel units comprises a direction stopper arranged to fixate an orientation of the corresponding wheel.